C. M. CUPPEL.
MILK STRAINER.
APPLICATION FILED MAY 26, 1911.
1,017,083.
Patented Feb. 13, 1912.
2 SHEETS—SHEET 1.
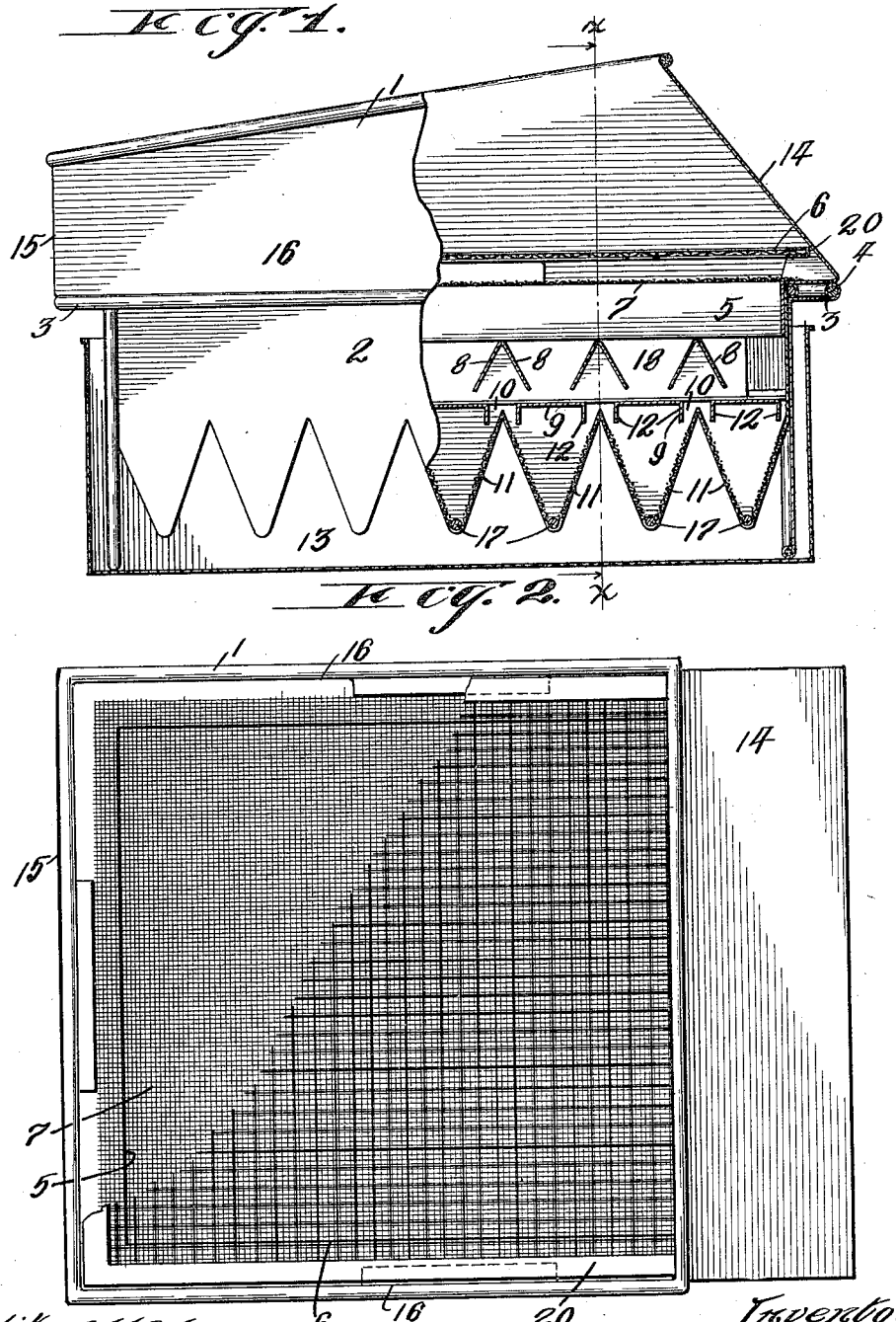

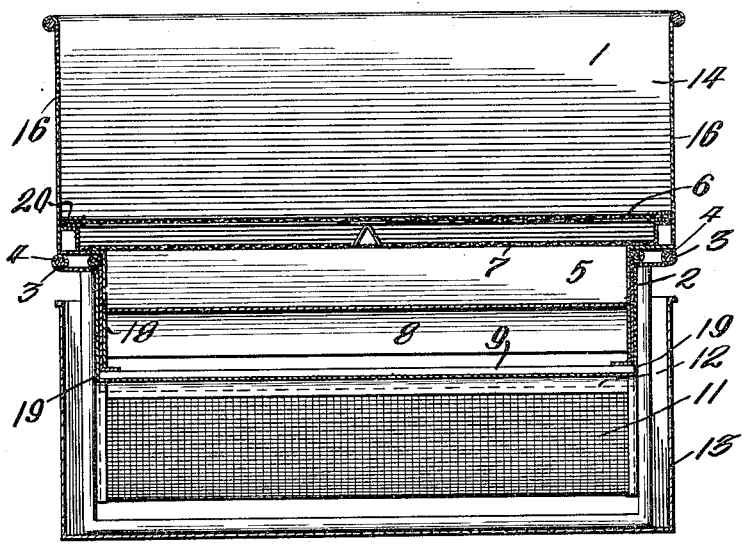
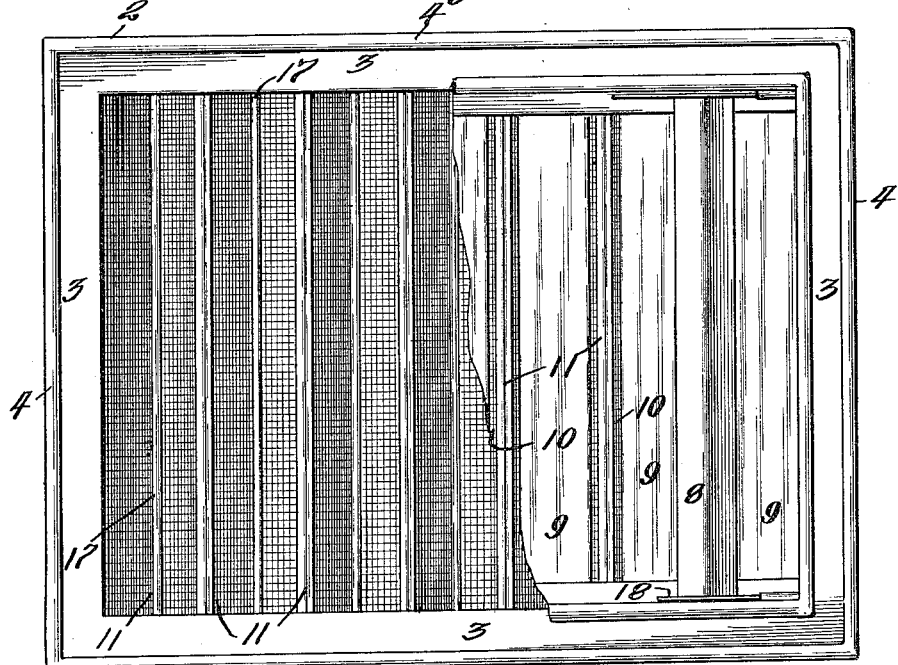

UNITED STATES PATENT OFFICE.

CHARLES M. CUPPEL, OF MILWAUKEE, WISCONSIN.

MILK-STRAINER.

1,017,083.  Specification of Letters Patent.  Patented Feb. 13, 1912.

Application filed May 26, 1911. Serial No. 629,729.

*To all whom it may concern:*

Be it known that I, CHARLES M. CUPPEL, a citizen of the United States, residing at Milwaukee, county of Milwaukee, and State of Wisconsin, have invented new and useful Improvements in Milk-Strainers, of which the following is a specification.

My invention relates to improvements in milk strainers, and it pertains more especially, among other things, 1st, to the device for increasing the surface area of a screen within a given sized tank. 2nd, to the device for distributing the milk uniformly over the entire surface of the screen, and for retarding its flow, whereby it will be gradually led to the surface of the screen and whereby the liability of the refuse matter which has previously been screened out, being forced by excessive pressure through the screen as heretofore, is avoided. 3rd, to the device for supporting and reinforcing the screen, whereby the liability of its becoming torn or sagged by excessive pressure, is prevented, and 4th, to the construction of the upper tank into which the milk is first poured, whereby the liability of its slushing over as a large can of milk is being quickly discharged therein, is avoided.

My invention is further explained by reference to the accompanying drawings, in which—

Figure 1 represents a side view thereof, part in section, disclosing the interior construction. Fig. 2 represents a plan view. Fig. 3 is a transverse section drawn on line *x—x* of Fig. 1, and Fig. 4 is a plan view with a portion of the upper tank removed, whereby the lower screens are in view.

Like parts are identified by the same reference numerals throughout the several views.

1 represents the upper tank into which the milk is first discharged, and the same is supported upon the lower tank 2. The lower tank 2 is provided with a supporting flange 3, which projects past the respective sides and ends of the tank proper, and is provided with a strengthening bead 4. The upper tank 1 is provided at its sides and ends with a vertical flange 5, which is adapted to extend down within the interior walls of the lower tank, whereby all the milk is led from the upper to the lower tank, and the liability of its overflowing the upper edge of the lower tank is avoided. The upper tank is provided with a coarse horizontal screen 6, by which the coarser refuse matter, if any, is removed from the milk, while it is provided at a short distance below with an additional screen of finer mesh 7. The upper screen 6 is made removable, whereby ready access is had to the lower screen 7 for the purpose of cleansing the same. The upper side of the lower tank is provided with a plurality of V-shaped partitions 8, the apexes of which are upward, whereby the flow of the milk as it passes through the screens 6 and 7 is partially arrested and subdivided into a plurality of currents, and thereby uniformly distributed over the horizontal partitions 9. The diverging edges of the V-shaped partitions 8 terminate at a slight distance above the upper surface of the partitions 9, and at a short distance from the center of said partitions, whereby the milk is caused to flow from said V-shaped partitions 8 upon the center of the said partitions 9, and its direct downward flow is thereby prevented; from thence it passes down through the longitudinal channels 10, and is uniformly distributed upon the respective sides of the V-shaped screens 11. The screens 11 converge at their upper ends centrally between the downwardly projecting flanges 12, 12, whereby the milk that passes through the channels 10 will be divided and caused to flow toward the right and left over the angular surface of said screen 11, when it passes from thence into the lower tank 13, preparatory to being withdrawn for use.

The rear wall 14 of the upper tank 1 is preferably inclined forwardly and extended at a considerable distance above the front wall 15, while the sides 16 diverge from the front toward the rear, terminating at the upper edge of the rear wall 14, whereby the liability of the milk being slushed over the rear wall as it is poured rapidly into the upper tank, is avoided. The apex of the downwardly converging screen 11 is provided with a plurality of transversely arranged rods 17, the ends of which are affixed to the sides of the lower tank 2, whereby said screen 11 is reinforced and strengthened. The V-shaped partitions 8 are all connected at their respective ends with supporting plates 18, while all of the partitions 9, together with their downwardly projecting flanges 12, are connected at their respective ends with the side walls 19. The upper screen is supported at its ends and respective sides from the rectangular frame 20, and all of said parts are detachably connected together, whereby each one may be removed independently of the others for cleansing purposes. For example, when desirous of cleansing the apparatus, the upper coarse screen 5 may be readily withdrawn from the upper tank 1. When this is done, the upper tank, together with the screen 7, may be withdrawn and the screen 7 cleansed. When this is done, the several angular partitions 8, together with their supporting end plates, may be withdrawn and cleansed, and when this is done, the several horizontal partitions 9, together with their downwardly projecting flanges 12 and supporting plates 18, may be withdrawn and cleansed, when the lower screen, together with its inclosing end and side walls may be withdrawn from the inclosing tank 13, whereby all of said parts may be, as stated, separated from each other for the purpose of cleansing the same, after which they may be replaced and will be retained in their proper relative position to each other by their own gravity.

Heretofore it has been common to empty a milk can, which frequently contains many gallons, upon a screen by which it is attempted to remove refuse matter therefrom, in which case it is obvious that the pressure of a large volume of milk thus rapidly discharged into a receptacle not only has a tendency to sag the screen and concentrate the pressure toward its center, but also to force such refuse matter as has accumulated in the screen, through the same, whereby the milk is passed through the receptacle without being properly cleansed. It will be obvious, however, that by the construction shown, the milk is not only uniformly distributed over the entire surface of the screen, but its momentum is arrested by the plurality of partitions and retarding channels over and through which it is caused to flow, while by the angular shape of the lower screen 11, its surface area is greatly increased, and the screen itself is strengthened and reinforced.

Having thus described my invention, what I claim as new, and desire to secure by Letters Patent, is—

1. In a device of the described class, a milk strainer consisting of the combination of a plurality of separable tanks arranged one above the other, a plurality of screens detachably supported in said tanks, a plurality of partitions located in said tanks provided with open spaces for the passage of milk, the open spaces in one partition being formed opposite the closed portions of the next adjacent partition, whereby the direct downward flow of milk through said spaces is retarded and the same is more uniformly distributed over the lower screen, and a lower screen comprising a plurality of angular inverted V-shaped sections located in the lower tank of the series.

2. In a device of the described class, a milk strainer consisting of the combination of a plurality of separable tanks arranged one above the other, the upper tank of the series being provided upon its lower side with telescoping flanges adapted to be inserted within the mouth of the next succeeding tank below, a plurality of screens detachably supported in said tanks, a plurality of partitions located in said tanks provided with open spaces for the passage of milk, the open spaces in one partition being formed opposite the closed portions of the next adjacent partition, whereby the direct downward flow of milk through said spaces is retarded and the same is more uniformly distributed over the lower screen, and a lower screen comprising a plurality of angular inverted V-shaped sections located in the lower tank of the series.

3. In a device of the described class, the combination of a plurality of separable tanks arranged one above the other, the rear end of the upper tank being inclined upwardly and forwardly, above and at an angle to the front wall, said tank being provided on its respective sides with angular vertical walls diverging upwardly from their front to their rear ends, said tank being provided upon its respective ends and sides with a vertical flange adapted to enter the mouth of the next succeeding tank below, a plurality of screens of different mesh supported at a slight distance apart in said upper tank, a plurality of inverted V-shaped screens supported at their respective ends from the walls of the lower tank, a series of horizontal partitions having open spaces between them, said horizontal partitions being respectively provided on their respective sides with vertical flanges extending downwardly past the apexes of said screens, and a series of angular V-shaped partitions interposed between said horizontal partitions and the next succeeding screen above, the lower diverging edges of said angular partitions straddling the open spaces between said horizontal partitions, whereby the downward current of milk is subdivided and uniformly spread over the entire surface of the said lower screen, said screens and partitions being detachably connected together, whereby they are adapted to be separated for cleansing, all substantially as and for the purpose specified.

In testimony whereof I affix my signature in the presence of two witnesses.

CHARLES M. CUPPEL.

Witnesses:
Jas. B. Erwin,
I. D. Bremer.

Copies of this patent may be obtained for five cents each, by addressing the "Commissioner of Patents, Washington, D. C."